Oct. 11, 1960 J. P. MILLER ET AL 2,955,800
TURBOMACHINE STATOR ASSEMBLY
Filed May 28, 1957 2 Sheets-Sheet 1

INVENTORS
Joseph P. Miller,
Robert L. Allen, &
Harris C. True
BY
Paul Kilpatrick
ATTORNEY Oct. 11, 1960   J. P. MILLER ET AL   2,955,800
TURBOMACHINE STATOR ASSEMBLY
Filed May 28, 1957   2 Sheets-Sheet 2

INVENTORS
Joseph P. Miller,
Robert L. Allen &
BY Harris C. True

Paul Fitzpatrick
ATTORNEY

United States Patent Office 2,955,800
Patented Oct. 11, 1960

2,955,800

TURBOMACHINE STATOR ASSEMBLY

Joseph P. Miller, Indianapolis, Robert L. Allen, Greenwood, and Harris C. True, Indianapolis, Ind., assignors to General Motors Corporation, Detroit, Mich., a corporation of Delaware Filed May 28, 1957, Ser. No. 660,504

8 Claims. (Cl. 253—78)

This invention relates to turbomachine stators and more particularly to an improved turbomachine stator assembly for axial flow gas turbine engines.

The turbomachine stator assembly of this invention is of the general type comprising an outer casing, a plurality of segmented stator vane assemblies, and a plurality of interstage sealing means, and includes several unique and distinct features over known constructions. One feature is in the mounting means for securing the segments of each of the stator vane assemblies to the outer casing. The mounting means accurately locates the segments in axial, radial and circumferential directions and permits circumferential expansion of the segments with respect to each other during engine operation while maintaining the desired clearance between the segments. Another feature is in the attaching means for securing the segments of each of the stator vane assemblies to the interstage sealing means. The attaching means locates the sealing means in axial, radial and circumferential directions, and permits relative radial and circumferential movement between the segments and the sealing means to allow the segments to expand circumferentially during engine operation, as heretofore explained, and to allow the interstage sealing means to seal against the rotor shaft so as to provide a seal therebetween for each of the turbine stages.

These and other additional features of this invention will be readily apparent from the description of the invention.

The primary object of this invention is to provide a new and improved turbomachine stator assembly for axial flow gas turbine engines. Another object of this invention is to provide an improved mounting means for securing stator vane assemblies to an external casing. A further object of this invention is to provide an improved attaching means for securing interstage sealing means to stator vane assemblies.

These and other objects of this invention will be readily apparent from the following specification and drawings, wherein.

Figure 1:
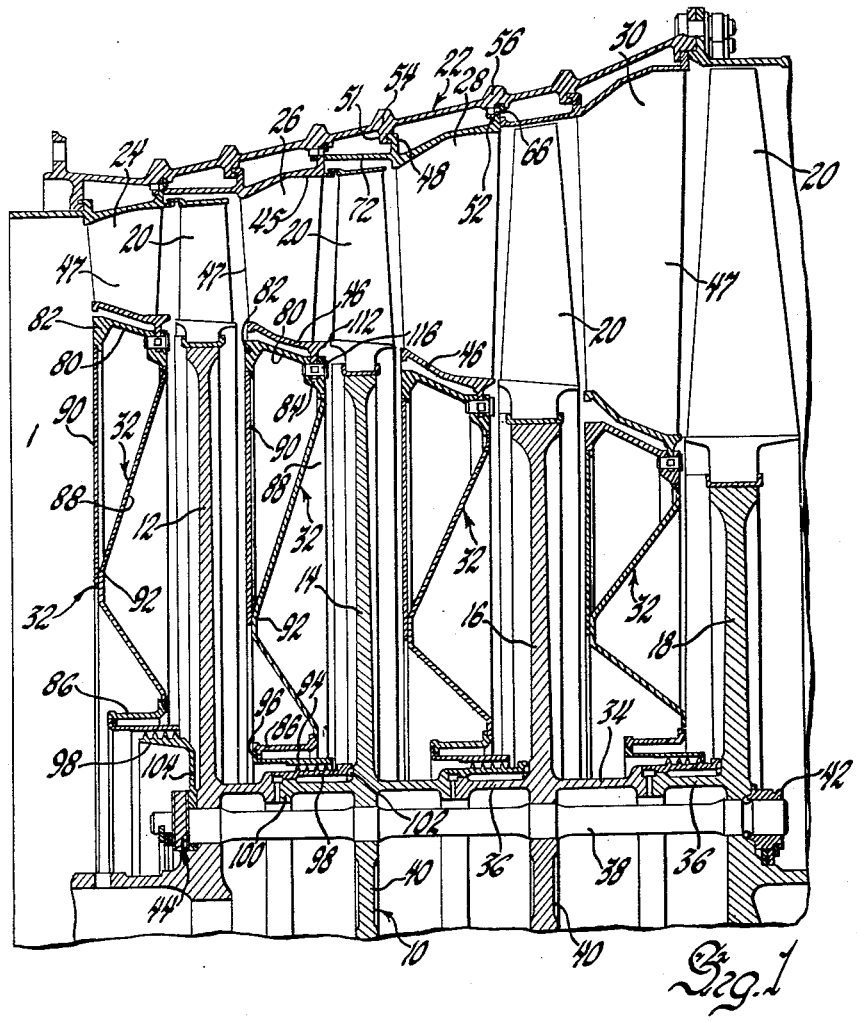
Figure 1 is a partial axial sectional view of a gas turbine engine embodying a stator assembly according to this invention.

Referring now to Figure 1 of the drawings, the turbine of an axial flow gas turbine engine includes a rotor 10 having a series of rotor wheels 12, 14, 16 and 18 each provided with an annular row of turbine buckets 20, an external casing 22, a plurality of segmented stator vane assemblies 24, 26, 28 and 30 secured to the turbine casing by mounting means according to this invention, and a diaphragm or interstage sealing means 32 secured to the segments of the stator vane assemblies of each stage by attaching means according to this invention and providing a seal between the turbine stages. Only that portion of the turbine necessary to an understanding of the invention is shown and will be described.

The rotor wheels 16 and 18 include opposite axially extending hub flanges 34 and 36, respectively, which are provided with intermeshing curvic splined faces so that the wheels may be circumferentially located with respect to each other to balance the turbine rotor. The rotor wheels 14 and 16 are provided with the same hub flanges having the intermeshing curvic splined faces as are the rotor wheels 16 and 18. A number of annularly spaced tie bolts 38 extend through suitable openings in each of the hubs 40 of the rotor wheels and are suitably anchored at each end thereof at 42 and 44 in order to hold the intermeshing curvic splined faces 38 in engagement with each other and hold the rotor wheels together to form the turbine rotor. It will be understood that the turbine rotor is supported in a suitable manner on the casing 22.

Each of the stator vane stages includes a plurality of circumferentially spaced segments, each segment including an outer shroud ring segment 45 and an inner shroud ring segment 46 joined by a plurality of stator vanes 47. Each of the segments is of the same construction, and each is secured to the outer casing 22 and the interstage sealing means 32 by respective mounting means and attaching means according to this invention, as will be described. In the construction illustrated, there are seven segments to each assembly, and reference may be had to U.S. Patent 2,766,963 to Zimmerman, for a more complete showing of the general structure of the segmented vane assemblies.

The outer shroud ring segment 45 of each of the segments includes a radially outwardly extending pair of axially spaced annular ribs 48 and 50. The turbine casing 22 is provided with a pair of radially inwardly extending axially spaced annular ribs 51 and 52 which are continuous around the casing and are reinforced by radially outwardly extending continuous annular ribs 54 and 56. As may be seen particularly in Figure 2 of the drawings, the rib 51 is provided with a continuous annular axially opening groove 58 which receives an annular axially extending flange 60 of the outer shroud ring segment 45 in order to radially locate the ribs 48 and 51 with respect to each other and allow both axial and circumferential movement of the ribs 48 and 51 relative to each other so that each of the stator vane assemblies may be mounted within the casing, as will be described, and the segments of each of the assemblies may expand circumferentially relative to the casing during engine operation.

Figure 3:
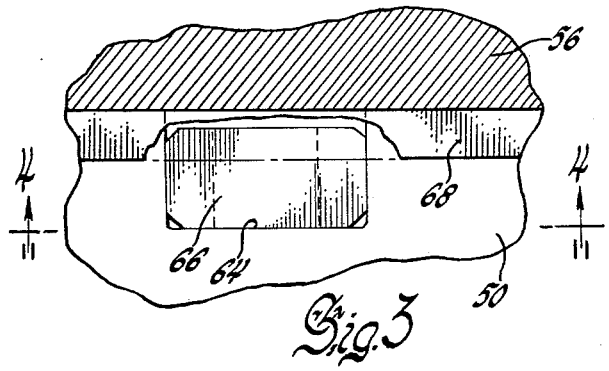
Figure 3 is a sectional view taken on the plane indicated by line 3—3 of Figure 2.
Figure 4:
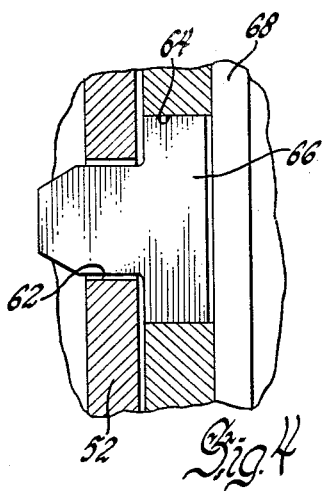
Figure 4 is a sectional view taken on the plane indicated by line 4—4 of Figure 3.

As shown particularly in Figure 4 of the drawings, the rib 52 is provided with a generally square-shaped slot 62. A similarly shaped slot 64 is provided in the abutting rib 50, but is larger in size, as may be seen in Figures 3 and 4 of the drawings. A key 66 of T shape fits within both of the slots 62 and 64 so as to accurately radially locate the ribs 50 and 52 with respect to each other since the key fits flush with all of the sides of slot 64 and the radially inner and outer sides of slot 62, Figure 2. However, a slight clearance is maintained between the key 66 and the circumferentially spaced sides of slot 62 to allow for some circumferential movement of the segment and key 66 relative to rib 52 and slot 62 for ease of assembly. As may be seen particularly in Figure 2 of the drawings, an annular expanding snap ring 68 is received within a groove 70 in each of the ribs 56 and extends partially over the opening of the slot 64 in engagement with rib 50 in order to maintain the key 66 within the slots 62 or 64 and prevent axial movement between the pairs of ribs 48, 51, and 50, 52. Thus, the outer shroud ring segments of each of the stator vane assembly segments are secured to the casing 22 in a manner which accurately locates the segments in axial and radial direction with respect to each other and the casing 22 but permits circumferential movement of the segments relative to the casing and each other due to expansion during engine operation.

Figure 2:
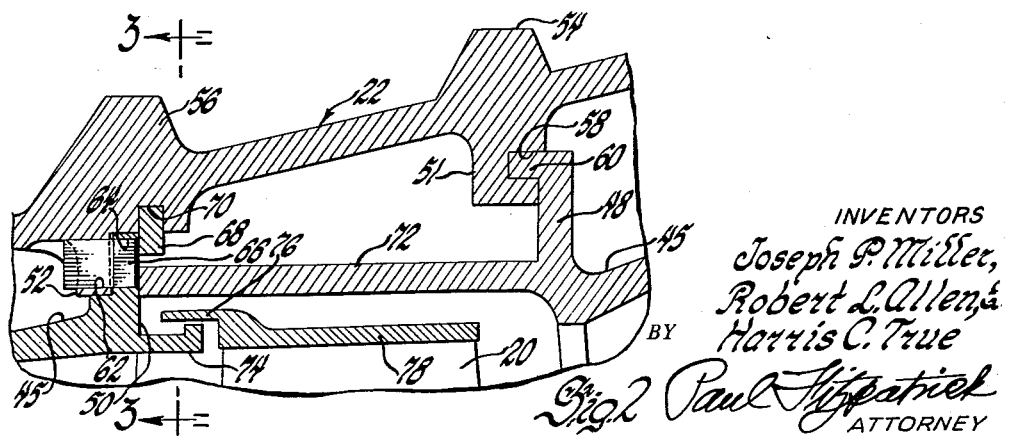
Figure 2 is an enlarged view of a portion of Figure 1 showing the mounting means for securing the segments of the stator vane assembly to the external casing.

As may be seen in Figures 1 and 2, the outer shroud ring segments of the stator vane assemblies are each provided with an annular flange segment 72 which extends axially therefrom to immediately adjacent the ribs 50 of the preceding stator vane outer shroud ring segments. Also, as may be seen in Figures 1 and 2, the ribs 50 of the segments of the stator vane assemblies 24 and 26 are provided with an axially extending angular flange 74 which approaches flanges 76 of the shroud rings 78 for the turbine buckets 20 of the rotor wheels 12 and 14. Although the buckets of these rotor wheels are shown as being shrouded, this is not necessary in all installations.

Referring now particularly to Figure 1 of the drawings, one of the interstage sealing means 32 will be described. Each sealing means includes an outer ring 80 having ribs 82 and 84, an inner ring 86, an annular double conical sheet metal disk 88 which is welded or otherwise secured to the rib 84 of the outer ring and to one end of the inner ring 86, and an annular sheet metal disk 90 secured to the disk 88 at 92 and to the rib 82 of the outer ring 80. The inner ring mounts an annular sealing member 94 which is secured thereto at 96 in a suitable manner. A labyrinth type annular sealing member 98 is secured at one end thereof in a suitable manner to a rib 100 of each flange 36 and the other end thereof seals against the rotor wheel 14 at 102 in a suitable manner. The sealing member 94 seats against the sealing member 98 to provide a rotating seal between successive rotor wheels. Substantially the same type of seal is provided between the rotor wheel 12 and the preceding rotor wheel, not shown, except that in this instance the sealing member 98 is provided with an annular flange 104 which is clamped against the turbine wheel 12 by the anchoring means 44 for the tie bolts 38.

Figure 5:
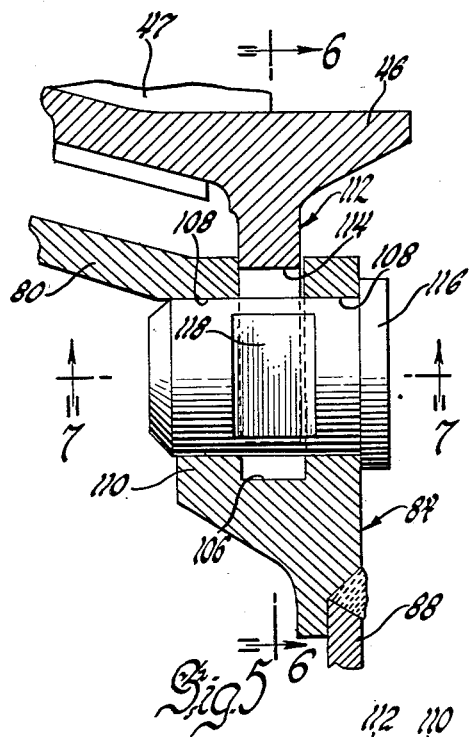
Figure 5 is an enlarged view of a portion of Figure 1 showing the attaching means for securing the interstage sealing means to the segments of the stator vane assembly.
Figure 6:
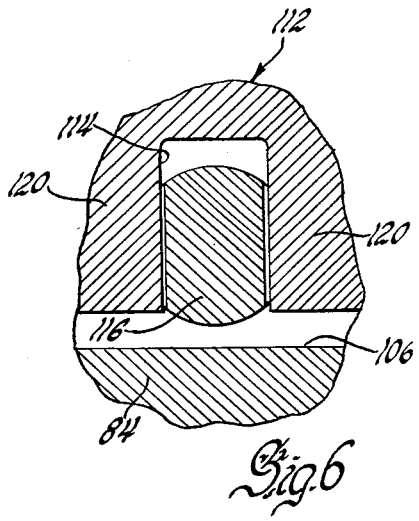
Figure 6 is a sectional view taken on the plane indicated by line 6—6 of Figure 5.
Figure 7:
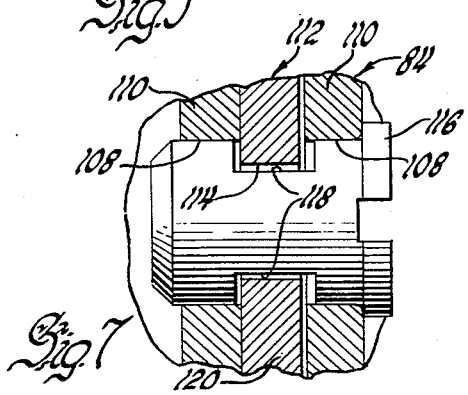
Figure 7 is a sectional view taken on the plane indicated by line 7—7 of Figure 6.

Referring now particularly to Figures 5 through 7 of the drawings, the manner in which the inner shroud ring segments 46 of each segment of the stator vane assemblies are secured to the interstage sealing means 32 will be described. The rib 84 of the outer ring 80 of the interstage sealing means is provided with a continuous annular radially outwardly opening groove 106. At a number of circumferentially spaced locations corresponding to the number of segments of each stator, a circular bore 108 is provided in each of the side walls 110 which define the groove 106, with the bores 108 being aligned with respect to each other. The inner shroud ring segment 46 is provided with an annular radially inwardly extending flange 112 which is slightly smaller in width than the width of the groove 106 and which is received within the groove, as may be seen particularly in Figures 6 and 7. The flange 112 is provided with a square-shaped slot 114 which opens downwardly to the base of the groove 106, as shown in Figure 6, with a slot 114 being provided for each pair of bores 108. A circular headed key 116 is received within each pair of bores 108 and is provided with an intermediate pair of oppositely disposed slots 118 which receive the adjacent side wall portions 120 defining each of the slots 114. As may be seen in Figure 7, a slight clearance is maintained between slots 118 and portions 120 to allow for relative radial and axial movement between each of the segments of the stator vane assemblies and the sealing means 32.

By use of the keys 116 to slidably connect each of the interstage sealing means 32 to each segment of the stator vane assemblies, the equalizer means may be concentrically adjusted with respect to the hub flanges 34 and 36 of the rotor wheels so as to provide for adequate sealing conditons between the sealing members 94 and 98.

In assembling the turbine, the first stage stator vane assembly 24 and its interstage sealing means 32 are inserted into the case 22 from the right hand side thereof and each of the segments of the assembly are then mounted on the casing, as previously described. The rotor wheel 12 and its sealing member 98 are then inserted into the case 22 and then the second stage stator vane assembly 26 and its interstage sealing means 32 are inserted and mounted in the same manner as the first stage assembly 24. Thereafter, the remainder of the rotor wheels and stator vane assemblies are alternately and successively placed and mounted within the case and subsequently the tie bolts 38 are assembled with the rotor wheels. The turbine may be disassembled in the same manner.

Thus, this invention provides an improved turbomachine stator assembly for axial flow gas turbine engines which includes segmented stator vane assemblies having improved mounting and attaching means for securing the segments of each assembly to the turbine case and the interstage sealing means.

While a specific embodiment of this invention has been shown and described, various changes and modifications may be made within the scope and spirit of the invention.

We claim:

1. An axial flow turbine stator assembly comprising a turbine case having axially spaced annular ribs, a stator vane assembly including axially spaced annular ribs positioned adjacent said case annular ribs to define axially spaced pairs of ribs, tongue and groove means formed on respective adjacent ribs of one of said pairs of ribs interconnecting said ribs radially locating said ribs with respect to each other and permitting relative circumferential and axial movement therebetween, axially extending keyway means on said ribs of said other of said pairs, axially disposed key means fitting within said keyway means interconnecting said latter ribs for locating said ribs of said other of said pairs with respect to each other and preventing relative circumferential movement between said spaced pairs of ribs, and means on said casing for maintaining said key means within said keyway means and thereby preventing relative axial movement between said spaced pairs of ribs.

2. An axial flow turbine stator assembly comprising a turbine case having axially spaced annular ribs, a stator vane assembly including axially spaced annular ribs positioned adjacent said case annular ribs to define axially spaced pairs of ribs, an annular groove on one of said case ribs, an annular flange on an adjacent vane rib seating within said groove to thereby radially locate one of said pairs of ribs with respect to each other and permit relative axial and circumferential movement therebetween, axially extending slot means on said ribs of said other of said pairs defining an axially extending keyway, an axially disposed key fitting within said keyway for radially locating said ribs of said other of said pairs with respect to each other and preventing relative circumferential movement between said spaced pairs of ribs, and an annular ring on said case for maintaining said key within said keyway and thereby preventing relative axial movement between said spaced pairs of ribs.

3. An axial flow turbine stator assembly comprising a turbine case having axially spaced annular ribs, a stator vane assembly including axially spaced annular ribs positioned adjacent said case annular ribs to define axially spaced pairs of ribs, an annular groove on one of said case ribs, an annular flange on an adjacent vane rib seating within said groove to thereby radially locate one of said pairs of ribs with respect to each other and permit relative axial and circumferential movement therebetween, axially extending slot means on said ribs of said other of said pairs defining an axially extending keyway, an axially disposed key fitting within said keyway substantially flush with the opening of one of said slots for radially locating said ribs of said other of said pairs with respect to each other and preventing relative circumferential movement between said spaced pairs of ribs, and an annular split ring on said case fitting over said opening of said one of said slots for maintaining said key within said keyway and thereby preventing relative axial movement between said spaced pairs of ribs.

4. An axial flow turbine stator assembly comprising a turbine case, a turbine rotor supported by said case and including a pair of rotor wheels, a stator vane assembly including a plurality of segments, each of said segments including an outer shroud ring member and an inner shroud ring member, means mounting said outer shroud ring members on said case, annular interstage sealing means between said rotor wheels, and pin and slot means securing each of said inner shroud ring members to said interstage sealing means, said pin means each having a plurality of slots therein, each of said inner shroud ring members being positioned for cooperation between said slots and slot means to axially position said pin means and prevent axial movement thereof.

5. An axial flow turbomachine stator assembly comprising, in combination, a case having axially spaced annular ribs, a stator vane row comprising a plurality of segments disposed in a ring within said case, each segment having two axially spaced annular ribs each engaging one of said ribs on said case to define axially spaced pairs of engaging ribs, one of said ribs having an axially opening groove therein and the engaging rib having an axially extending flange thereon received in said groove to locate the segmet radially with respect to the case, one pair of said ribs defining an axially extending slot through the rib of each segment and an axially extending slot in the case rib aligned with each said segment rib slot, each such set of aligned slots defining an axially extending keyway, an axially disposed key mounted in each said keyway and terminating substantially flush with the outer face of said segment rib and locating said segment circumferentially with respect to said case, and an annular split ring mounted in said case closely adjacent said face retaining said keys in said keyways and restraining said segment ribs against movement axially away from said case ribs.

6. An axial flow turbomachine stator assembly comprising, in combination, a case having internal annular rib means, a stator vane row comprising a plurality of segments disposed in a ring within said case, each segment having external annular rib means engaging the said rib means on said case, one of said rib means having an axially opening groove therein and the engaging rib means having an axially extending flange thereon received in said groove to locate the segment radially with respect to the case, said rib means defining an axially extending slot through the rib means of each segment and an axially extending slot in the rib means of the case aligned with each said segment rib slot, each such set of aligned slots defining an axially extending keyway, an axially disposed key mounted in each said keyway and terminating substantially flush with the outer face of the segment rib means and locating said segment circumferentially with respect to said case, and an annular split ring mounted in said case closely adjacent said face retaining said keys in said keyways and restraining said segment rib means against movement axially away from said case rib means.

7. An axial flow turbomachine stator assembly comprising, in combination, a case having axially spaced annular ribs, a stator vane assembly having two axially spaced annular ribs each engaging one of said ribs on said case to define axially spaced pairs of engaging ribs, one pair of said ribs defining a plurality of axially extending slots through the rib of the vane assembly and an axially extending slot in the case rib aligned with each said vane assembly rib slot, each such set of aligned slots defining an axially extending keyway, an axially disposed key mounted in each said keyway and terminating substantially flush with the face of said vane assembly rib and locating said vane assembly with respect to said case, and an annular split ring mounted in said case closely adjacent said face retaining said keys in said keyways and restraining said vane assembly ribs against movement axially away from said case ribs.

8. An axial flow turbomachine stator assembly comprising, in combination, a case having an internal annular rib, a stator vane assembly having an external annular rib engaging said rib on said case, said ribs defining a plurality of axially extending slots through the rib of the vane assembly and an axially extending slot in the case rib aligned with each said vane assembly rib slot, each such set of aligned slots defining an axially extending keyway, an axially disposed key mounted in each said keyway and terminating substantially flush with the face of said vane assembly rib and locating said vane assembly with respect to said case, and an annular split ring mounted in said case closely adjacent said face retaining said keys in said keyways and restraining said vane assembly rib against movement axially away from said case rib.

References Cited in the file of this patent

UNITED STATES PATENTS 2,488,867    Judson _____ Nov. 22, 1949
2,847,185    Petri et al. _____ Aug. 12, 1958